United States Patent
Li et al.

(10) Patent No.: US 10,474,757 B2
(45) Date of Patent: Nov. 12, 2019

(54) ARTIFICIAL INTELLIGENCE BASED METHOD AND APPARATUS FOR GENERATING INFORMATION

(71) Applicant: BEIJING BAIDU NETCOM SCIENCE AND TECHNOLOGY CO., LTD., Beijing (CN)

(72) Inventors: Yukun Li, Beijing (CN); Yi Liu, Beijing (CN); Yu Sun, Beijing (CN); Dianhai Yu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/900,176

(22) Filed: Feb. 20, 2018

(65) Prior Publication Data
US 2018/0329886 A1    Nov. 15, 2018

(30) Foreign Application Priority Data
May 15, 2017   (CN) .......................... 2017 1 0339209

(51) Int. Cl.
G06F 17/27  (2006.01)
G06N 3/04   (2006.01)
G06N 3/08   (2006.01)

(52) U.S. Cl.
CPC ........ G06F 17/2785 (2013.01); G06F 17/277 (2013.01); G06N 3/0454 (2013.01); G06N 3/08 (2013.01); *G06N 3/0481* (2013.01)

(58) Field of Classification Search
CPC . G06F 17/2785; G06F 17/277; G06N 3/0454; G06N 3/08
See application file for complete search history.

(56) References Cited

U.S. PATENT DOCUMENTS

| | | | | |
|---|---|---|---|---|
| 5,448,474 A | * | 9/1995 | Zamora | ................. G06F 17/274 400/110 |
| 2017/0213138 A1 | * | 7/2017 | Bojja | ....................... G06N 5/04 |
| 2018/0203848 A1 | * | 7/2018 | Perez | ...................... G10L 25/30 |

OTHER PUBLICATIONS

Zhang et al., Study of Sentiment Classification for Chinese Microblog Based on Recurrent Neural Network, Jul. 4, 2016, Chinese Journal of Electronics, vol. 25 (Year: 2016).*

* cited by examiner

*Primary Examiner* — Sonia L Gay
(74) *Attorney, Agent, or Firm* — Seed IP Law Group LLP

(57) ABSTRACT

An artificial intelligence based method and apparatus for generating information are disclosed. The method in an embodiment includes: segmenting a to-be-processed text into characters to obtain a character sequence; determining a character vector for each character in the character sequence to generate a character vector sequence; generating a plurality of character vector subsequences by segmenting the character vector sequence based on a preset vocabulary; for each generated character vector subsequence, determining a sum of character vectors composing the character vector subsequence as a target vector, and inputting the target vector into a pre-trained first neural network to obtain a word vector corresponding to the each character vector subsequence, the first neural network used to characterize a correspondence between the target vector and the word vector; and analyzing the to-be-processed text based on the obtained word vector to generate an analysis result. This embodiment improves the adaptability of text processing.

9 Claims, 5 Drawing Sheets

ARTIFICIAL INTELLIGENCE BASED METHOD AND APPARATUS FOR GENERATING INFORMATION

CROSS-REFERENCE TO RELATED APPLICATION

This application is related to and claims priority from Chinese Application No. 201710339209.4, filed on May 15, 2017 and entitled "Artificial Intelligence Based Method and Apparatus for Generating Information", the entire disclosure of which is hereby incorporated by reference.

TECHNICAL FIELD

The present application relates to the field of computer technology, specifically to the field of Internet technology, and more specifically to an artificial intelligence based method and apparatus for generating information.

BACKGROUND

Artificial intelligence (AI) is a new technological science which researches on and develops theories, methods, techniques and application systems for simulating, extending and expanding human intelligence. As a branch of the computer science, artificial Intelligence attempts to learn the principle of intelligence and produce a novel intelligent machine capable of making response in a way similar to human intelligence. The researches in this field include robot, language recognition, image recognition, natural language processing and expert systems, etc. Natural language processing in the field of artificial intelligence is an important direction in the field of the computer science and the field of artificial intelligence. It researches on various theories and methods which enable an effective communication between human and the computer in natural languages. Typically, natural language processing requires use of a vector to express each character in a corpus, and the vector is referred to as a word vector.

However, the existing methods usually obtain the word vector by inquiring a preset word vector matrix (for example, an embedding matrix), and then obtain the processing result of the text. Due to the large number of Chinese vocabularies, parameter size of the word vector matrix is very large, resulting in higher requirements on the performance of the physical storage, the network transmission and the memory, etc. of the computing device, thus causing a poor adaptability.

SUMMARY

The present disclosure provides an improved artificial intelligence based method and apparatus for generating information, in order to solve the technical problem mentioned in the foregoing Background section.

In a first aspect, an embodiment of the present disclosure provides an artificial intelligence based method for generating information, the method comprising: segmenting a to-be-processed text into characters to obtain a character sequence; determining a character vector for each character in the character sequence to generate a character vector sequence; generating a plurality of character vector subsequences, by segmenting the character vector sequence based on a preset vocabulary; determining, for each generated character vector subsequence, a sum of character vectors composing the each character vector subsequence as a target vector, and inputting the target vector into a pre-trained first neural network to obtain a word vector corresponding to the each character vector subsequence, wherein the first neural network is used to characterize a correspondence between the target vector and the word vector; and analyzing the to-be-processed text based on the obtained word vector to generate an analysis result.

In some embodiments, before the analysing the to-be-processed text based on the obtained word vector to generate an analysis result, the method further comprising: inputting, for the each character vector subsequence, the obtained word vector corresponding to the each character vector subsequence into a pre-trained second neural network, determining a vector output by the second neural network as a characteristic vector corresponding to the character vector subsequence, wherein the second neural network is used to extract a text characteristic; and replacing the word vector corresponding to the each character vector subsequence with the characteristic vector corresponding to the each character vector subsequence.

In some embodiments, the analyzing the to-be-processed text based on the obtained word vector to generate an analysis result comprises: inputting the obtained word vector into a pre-trained text emotion analysis model to obtain a text emotion analysis result corresponding to the to-be-processed text, wherein the emotion analysis model is used to characterize a correspondence between the word vector and the text emotion analysis result.

In some embodiments, the analyzing the to-be-processed text based on the obtained word vector to generate an analysis result comprises: extracting successively word vectors corresponding to the character vector subsequences according to a sequential order of the character vector subsequences in character vectors, to generate a word vector sequence; and inputting the word vector sequence and a pre-generated word vector sequence corresponding to a preset text respectively into a pre-trained similarity calculation model, to obtain a similarity calculation result of the to-be-processed text and the preset text, wherein the similarity calculation model is used to characterize a correspondence between the word vector sequence corresponding to a plurality of texts and a similarity calculation result of the plurality of texts.

In some embodiments, the method further comprises training the first neural network, comprising: extracting a preset first training sample, wherein the first training sample includes a plurality of first preset words and word vectors of the first preset words in the plurality of first preset words; determining, for each of the plurality of first preset words in the first training sample, character vectors for characters composing the first preset word, to generate a character vector sequence corresponding to the first preset word; and training and obtaining the first neural network, by using a machine learning method, and by assigning the character vector sequence corresponding to the first preset word as an input, and the word vector of the first preset word in the first training sample as an output.

In some embodiments, the method further comprises training the second neural network, comprising: extracting a preset second training sample, wherein the second training sample includes a plurality of second preset words and word vectors of the second preset words in the plurality of second preset words; determining, for each of the plurality of second preset words in the second training sample, character vectors for character composing the second preset word, to generate a character vector sequence corresponding to the second preset word; inputting the character vector sequence corresponding to each second preset word in the second training sample into the first neural network, and determining a vector output by the first neural network as an intermediate vector corresponding to the second preset word; and training and obtaining the second neural network, by using the machine learning method, and by assigning an intermediate vector sequence corresponding to the second preset word as an input, and the word vector of the second preset word in the second training sample as an output.

In a second aspect, an embodiment of the present disclosure provides an artificial intelligence based apparatus for generating information, the apparatus comprising: a segmentation unit, configured to segment a to-be-processed text into characters to obtain a character sequence; a first determining unit, configured to determine a character vector for each character in the character sequence to generate a character vector sequence; a generation unit, configured to generate a plurality of character vector subsequences, by segmenting the character vector sequence based on a preset vocabulary; a first input unit, configured to determine, for each generated character vector subsequence, a sum of character vectors composing the each character vector subsequence as a target vector, and to input the target vector into a pre-trained first neural network to obtain a word vector corresponding to the each character vector subsequence, wherein the first neural network is used to characterize a correspondence between the target vector and the word vector; and an analyzing unit, configured to analyze the to-be-processed text based on the obtained word vector to generate an analysis result.

In some embodiments, the apparatus further comprises: a second input unit, configured to input, for the each character vector subsequence, the obtained word vector corresponding to the each character vector subsequence into a pre-trained second neural network, and to determine a vector output by the second neural network as a characteristic vector corresponding to the character vector subsequence, wherein the second neural network is used to extract a text characteristic; and a replacing unit, configured to replace the word vector corresponding to the each character vector subsequence with the characteristic vector corresponding to the each character vector subsequence.

In some embodiments, the analysing unit is further configured to: input the obtained word vector into a pre-trained text emotion analysis model to obtain a text emotion analysis result corresponding to the to-be-processed text, wherein the emotion analysis model is used to characterize a correspondence between the word vector and the text emotion analysis result.

In some embodiments, the analysing unit is further configured to: extract successively word vectors corresponding to the character vector subsequences according to a sequential order of the character vector subsequences in character vectors, to generate a word vector sequence; input the word vector sequence and a pre-generated word vector sequence corresponding to a preset text respectively into a pre-trained similarity calculation model, to obtain a similarity calculation result of the to-be-processed text and the preset text, wherein the similarity calculation model is used to characterize a correspondence between the word vector sequence corresponding to a plurality of texts and a similarity calculation result of the plurality of texts.

In some embodiments, the apparatus further comprises: a first extraction unit, configured to extract a preset first training sample, wherein the first training sample includes a plurality of first preset words and word vectors of the first preset words in the plurality of first preset words; a second determining unit, configured to determine, for each of the plurality of first preset words in the first training sample, character vectors for character composing the first preset word, to generate a character vector sequence corresponding to the first preset word; and a first training unit, configured to train and obtain the first neural network, by using a machine learning method, and by assigning the character vector sequence corresponding to the first preset word as an input, and the word vector of the first preset word in the first training sample as an output.

In some embodiments, the apparatus further comprises: a second extraction unit, configured to extract a preset second training sample, wherein the second training sample includes a plurality of second preset words and word vectors of the second preset words in the plurality of second preset words; a third determining unit, configured to determine, for each of the plurality of second preset words in the second training sample, character vectors for characters composing the second preset word, to generate a character vector sequence corresponding to the second preset word; a third input unit, configured to input the character vector sequence corresponding to each second preset character in the second training sample into the first neural network, and to determine a vector output by the first neural network as an intermediate vector corresponding to the second preset character; and a second training unit, configured to train and obtain the second neural network, by using the machine learning method, and by assigning an intermediate vector sequence corresponding to the second preset word as an input, and the word vector of the second preset word in the second training sample as an output.

In a third aspect, an embodiment of the present disclosure provides a server, comprising: one or more processors; a storage, configured to store one or more programs; and when the one or more programs being executed by the one or more processors, cause the one or more processors to implement an artificial intelligence based method for generating information according to any of the embodiments of the present disclosure.

By segmenting a to-be-processed text into characters to obtain a word sequence, in order to determine a character vector for each character in the character sequence to generate a character vector sequence, then generating a plurality of character vector subsequences, by segmenting the character vector sequence based on a preset vocabulary, obtaining a word vector corresponding to the each character vector subsequences based on a pre-trained first neural network, and finally analysing the to-be-processed text based on the obtained word vector to generate an analysis result, the artificial intelligence based method and apparatus for generating information provided by the embodiments of the present disclosure may generate word vectors based on word vectors. Since the number of Chinese characters is far less than the number of Chinese words, and word vectors maybe automatically generated by a pre-trained neural network without occupying static storage space, performance requirements for physical storage, network transmission and memory of computing devices may be therefore reduced, improving the adaptability of text processing.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
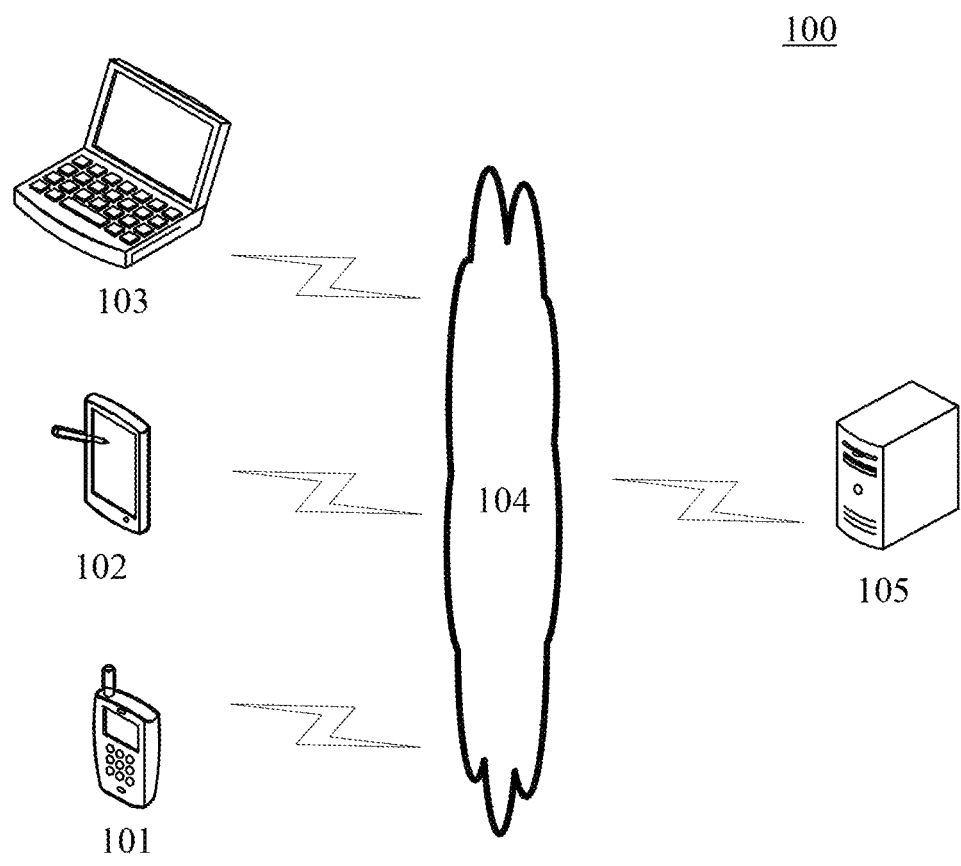
FIG. 1 is an architectural diagram of an exemplary system in which the present application may be implemented.

FIG. 1 shows an exemplary architecture of a system 100 which may be used by a method for generating information or apparatus for generating information according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The terminal devices 101, 102 and 103 may interact with the server 105 through the network 104, in order to transmit or receive messages, etc. Various communication client applications, such as text edition applications, browser applications, and reading applications may be installed on the terminal devices 101, 102 and 103.

The terminal devices 101, 102 and 103 may be various electronic devices having display screens and supporting text browser, including but not limited to, smart phones, tablet computers, e-book readers, laptop computers and desktop computers.

The server 105 maybe a server providing various services, for example, a processing server processing to-be-processed text stored on the terminal devices 101, 102 and 103. The processing server may segment and analyze the to-be-processed text and generate an analysis result.

It needs to be noted that the to-be-processed text may also be stored locally in the server 105. The server 105 may directly extract and process the locally-stored text to be checked. In this case, the terminal devices 101, 102, 103 and the network 104 may not exist.

It needs to be noted that the method for generating information provided by the embodiments of the present disclosure is generally executed by the server 105, and accordingly, the apparatus for generating information is generally provided in the server 105.

It should be appreciated that the numbers of the terminal devices, the networks and the servers in FIG. 1 are merely illustrative. Any number of terminal devices, networks and servers may be provided based on the implementation requirements.

Figure 2:
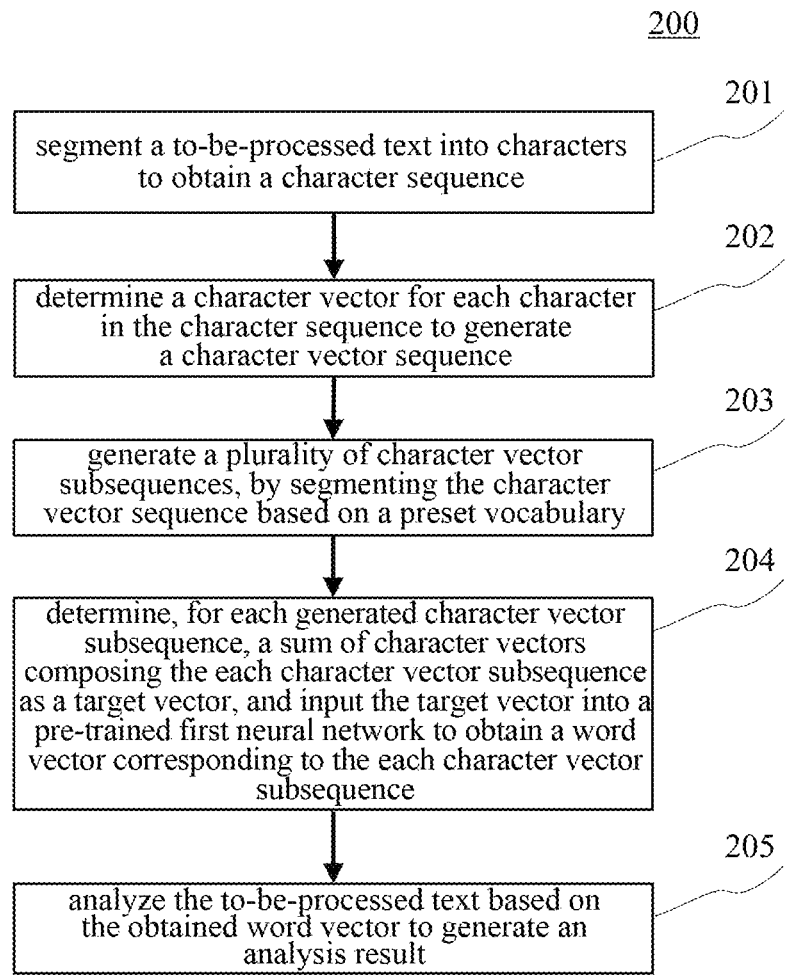
FIG. 2 is a flowchart of an embodiment of a method for generating information according to the present disclosure.

With further reference to FIG. 2, a flow 200 of an embodiment of the method for generating information according to the present disclosure is illustrated. The method for generating information includes the following steps:

Step 201, segmenting a to-be-processed text into characters to obtain a character sequence.

In the present embodiment, the electronic device (e.g., the server 105 as shown in FIG. 1) on which the method for generating information operates may first extract the to-be-processed text. Here, the to-be-processed text may be the text pre-designated by a technician and prestored in the electronic device, and the electronic device may directly extract the above prestored-text locally. In addition, the to-be-processed text may also be the text received by the electronic device from a client (for example, the terminal devices 101, 102 and 103 shown in FIG. 1) through a wired connection or a wireless connection. In practice, the client may send an analyzing request containing the to-be-processed text to the electronic device. After receiving the analyzing request, the electronic device may extract the to-be-processed text contained in the analyzing request. It needs to be noted that the to-be-processed text may be various text information, such as a sentence, a paragraph or a chapter. It needs to be noted that the above wireless connection method may include, but is not limited to, a 3G/4G connection, a WiFi connection, a Bluetooth connection, a WiMAX connection, a Zigbee connection, an UWB (ultra wideband) connection and other wireless connection methods known by now or to be developed in the future.

In the present embodiment, the electronic device may segment the to-be-processed text into characters to obtain the character sequence. As an example, the content of the to-be-processed text is "what is the best snack in Shangri-La?" The above electronic device may segment the to-be-processed text character by character to obtain the character sequence composed by the following characters in sequence: "what," "is," "the," "best," "snack," "in," "Shangri-La" and "?".

Step 202, determining a character vector for each character in the character sequence to generate a character vector sequence.

In the present embodiment, the electronic device may determine the character vector for each character in the character sequence by using various character vector generation methods, to generate the character vector sequence. Here, the sequential order of each character vector in the character vector sequence coincides with the sequential order of the character corresponding to the each character vector in the character sequence. It needs to be noted that a character vector may be a vector used to express a characteristic of a character, and the value of each dimension of the character vector may represent a characteristic with a certain semantic and grammatical explanation. Here, the characteristic may be various information for characterizing basic elements of the character, such as Chinese character components, radicals of Chinese characters, strokes and meanings. As an example, the electronic device may prestore a correspondence table of 21886 Chinese characters and graphic symbols contained in the Chinese Internal Code Specification (GBK) with character vectors, and the character vectors may have same dimensions. For each character in the character sequence, the electronic device may find the character vector corresponding to the each character from the correspondence table. Here, the character vector of each character and graphic symbol may be pre-trained and obtained by performing supervised training to the neural network using a machine learning method, or preset by a technician based on a large amount of data statistics. It needs to be noted that the above character vector generation method is a well-known technique that has been widely studied and applied so far, and detailed description thereof will be omitted.

Step 203, generating a plurality of character vector subsequences, by segmenting the character vector sequence based on a preset vocabulary.

In the present embodiment, the electronic device may prestore the preset vocabulary, and the preset vocabulary may be the vocabulary obtained based on statistics and character segmentation of a large number of corpuses in advance. The preset vocabulary may include a large number of records. Each record is in the form of a key-value pair whose key is a word and whose value is a character sequence of characters composing the word. As an example, the key of a record is "Beijing" and the value is "Bei" and "Jing".

In the present embodiment, the electronic device may generate the plurality of character vector subsequences, by segmenting the character vector sequence based on the preset vocabulary. Specifically, the electronic device may first match words that form records in the preset vocabulary with the to-be-processed text, and then perform word segmentation on the to-be-processed text based on the matched words. After that, the electronic device may obtain a character sequence corresponding to each segmented word by looking up the preset vocabulary. Then, for the character sequence corresponding to each segmented word, the electronic device may determine corresponding character vectors from the character vector sequence, so as to segment the character vector sequence into a plurality of character vector subsequences. As an example, the to-be-processed text is "Beijing is the capital of China." After the word segmentation, the following words are obtained: "Beijing," "is," "the," "capital," "of" and "China." The character sequence corresponding to the word "Beijing" is "Bei," "Jing." The electronic device may generate a character vector subsequence including character vectors corresponding to "Bei" and "Jing," respectively, in the character vector sequence. The character sequence corresponding to "is" is "is". The electronic device may use the character vector corresponding to "is" in the character vector sequence as a character vector subsequence. In this way, a plurality of character vector subsequences are obtained.

Step 204, determining, for each generated character vector subsequence, a sum of character vectors composing the each character vector subsequence as a target vector, and inputting the target vector into a pre-trained first neural network to obtain a word vector corresponding to the each character vector subsequence.

In the present embodiment, for the each generated character vector subsequence, the electronic device may determine the sum of the character vectors composing the character vector subsequence as the target vector, and input the target vector into the pre-trained first neural network to obtain the word vector corresponding to the character vector subsequence, wherein the first neural network may be used to characterize a correspondence between the target vector and the word vector. In practice, Neural Networks (NNs) may also be referred to as Connection Models. The neural network is a computational model consisting of a large number of nodes (also referred to as neurons) joining together. Each node represents a specific output function, which is referred to as an excitation function, also is referred to as an activation function. Here, the neurons of the pre-trained first neural network may perform calculation on the input target vector using any nonlinear activation function (for example, a Sigmoid function, a Softplus function, a bipolar Sigmoid function, and the like), and the outputted vector is the word vector corresponding to the character vector subsequence. The electronic device may perform supervised training to the above nonlinear activation function in advance to obtain the first neural network.

In some alternative implementations of the present embodiment, the first neural network may be trained and obtained through the following steps. First, a preset first training sample may be extracted, wherein the first training sample includes a plurality of first preset words and word vectors of the first preset words in the plurality of first preset words. After that, for each first preset word in the first training sample, character vectors of the characters composing the each first preset word are determined to generate a character vector sequence corresponding to the each first preset word. Then, the character vector sequence corresponding to the each first preset word is taken as an input, and the word vector of the each first preset word in the first training sample is taken as an output, to train the nonlinear activation function (for example, a tank function) to obtain the first neural network, using a machine learning method.

Step 205, analyzing the to-be-processed text based on the obtained word vector to generate an analysis result.

In the present embodiment, the electronic device may analyze the to-be-processed text using various analyzing methods based on the obtained word vector to generate the analysis result. It needs to be noted that the electronic device may perform various natural language processing that requires using of word vectors, which may include, but is not limited to, determination of emotion for a text via word segmentation, similarity analysis, spam identification, machine translation, automatic Q&A, and the like. For example, the electronic device may determine whether the obtained word vectors contain a word vector same to a preset word vector (for example, a word vector used to characterize a word for describing emotion such as "happy" or "sad"), or a similarity between the word vector and the preset word vector is greater than a preset similarity threshold (which may be any numerical value, for example, 0.5, 0.8, etc.). The electronic device may determine the emotion type of the to-be-processed text based on the matching of the word vector and the preset word vector. Here, the electronic device may calculate the similarity between each obtained word vector and the preset word vector using various similarity calculation methods (such as a cosine similarity algorithm, a Euclidean distance algorithm, a Jaccard similarity measurement method, and the like).

In some alternative implementations of the present embodiment, the electronic device may input the obtained word vector into a pre-trained text emotion analysis model to obtain a text emotion analysis result corresponding to the to-be-processed text, wherein the emotion analysis model is used to characterize a correspondence between the word vector and the text emotion analysis result. For example, the emotion analysis model may be obtained after performing supervised training to the existing models for text emotion classification such as Support Vector Machine (SVM) and Bag of Characters based on a large number of training samples, wherein the training samples may contain word vectors of the words composing the text for training and an emotion type identification for indicating the emotion type of the text.

In some alternative implementations of the present embodiment, the electronic device may extract successively word vectors corresponding to the character vector subsequences according to a sequential order of the character vector subsequences in character vectors, to generate a word vector sequence. Then, the electronic device may input the word vector sequence and a pre-generated word vector sequence corresponding to a preset text respectively into a pre-trained similarity calculation model, to obtain a similarity calculation result of the to-be-processed text and the preset text, wherein the similarity calculation model is used to characterize a correspondence between the word vector sequence corresponding to a plurality of texts and a similarity calculation result of the plurality of texts. For example, the similarity calculation model may be obtained after performing supervised training to the existing models for text similarity calculation such as Bag of Characters and Convolutional Neural Network (CNN) based on training samples, wherein the training samples may contain word vectors of words composing two texts for training and an identification for indicating whether the two texts are similar.

Figure 3:
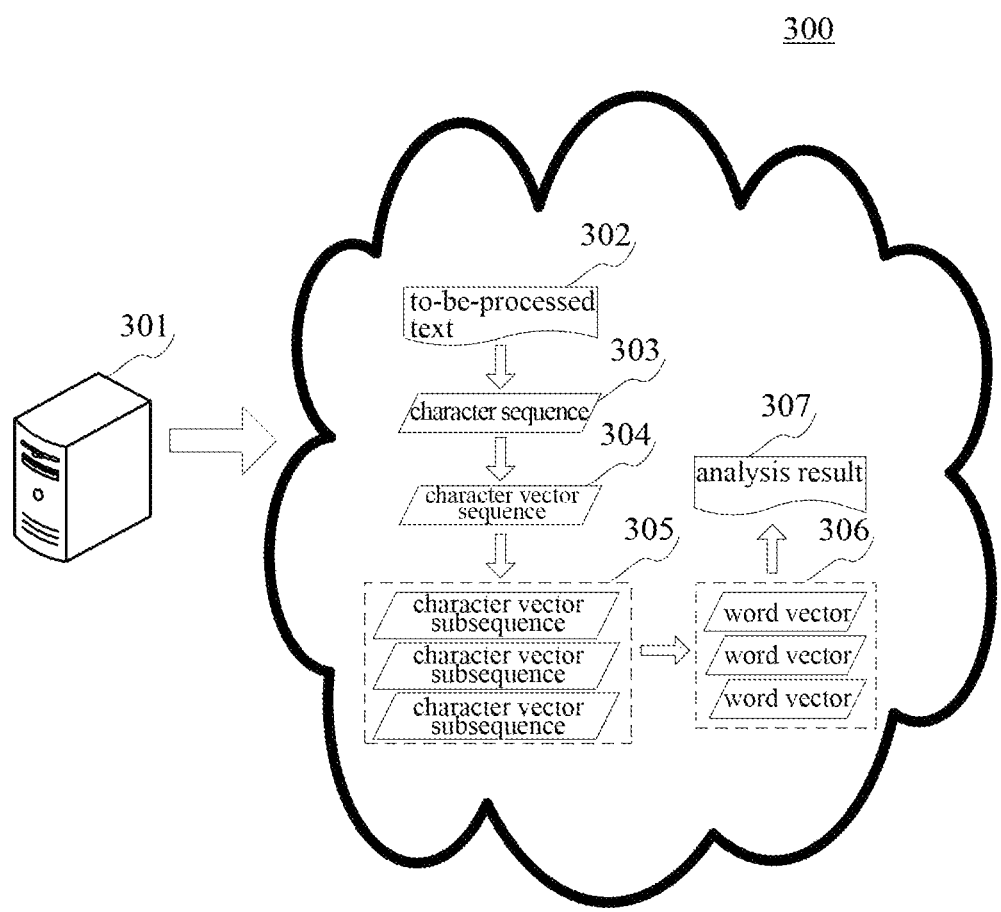
FIG. 3 is a schematic diagram of an application scenario of the method for generating information according to the present disclosure.

With further reference to FIG. 3, FIG. 3 is a schematic diagram of an application scenario of the method for generating information according to the present embodiment. In the application scenario of FIG. 3, the text 302 is "I am very happy". The server 301 first segment the to-be-processed text 302 into characters to obtain a character sequence 303 consisting of "I," "am," "very," "happy." After that, the server 301 determines a character vector of each character in the character sequence 303 to generate a character vector sequence 304. After that, the server 301 segments the character vector sequence 304 based on a preset vocabulary to generate a plurality of character vector subsequences 305, that is, "I" corresponds to a character vector subsequence, "am" corresponds to a character vector subsequence, "very" corresponds to a character vector subsequence, and "happy" corresponds to a character vector subsequence. Then, the server 301 obtains a word vector 306 corresponding to the character vector subsequence 305 based on a pre-trained first neural network. Finally, the server 301 performs emotion analysis on the to-be-processed text 302 based on the character vector 306 to obtain an analysis result 307 indicating that the emotion type of the to-be-processed text 302 is happy.

By segmenting a to-be-processed text into characters to obtain a character sequence, in order to determine a character vector for each character in the character sequence to generate a character vector sequence, then generating a plurality of character vector subsequences, by segmenting the character vector sequence based on a preset vocabulary, obtaining a word vector corresponding to the each character vector subsequence based on a pre-trained first neural network, and finally analyzing the to-be-processed text based on the obtained word vector to generate an analysis result, the method provided by the embodiments of the present disclosure may generate word vectors based on character vectors. Since the number of Chinese characters is far less than the number of Chinese words, and word vectors may be automatically generated by a pre-trained neural network without occupying static storage space, performance requirements for physical storage, network transmission and memory of computing devices may be therefore reduced, improving the adaptability of text processing.

Figure 4:
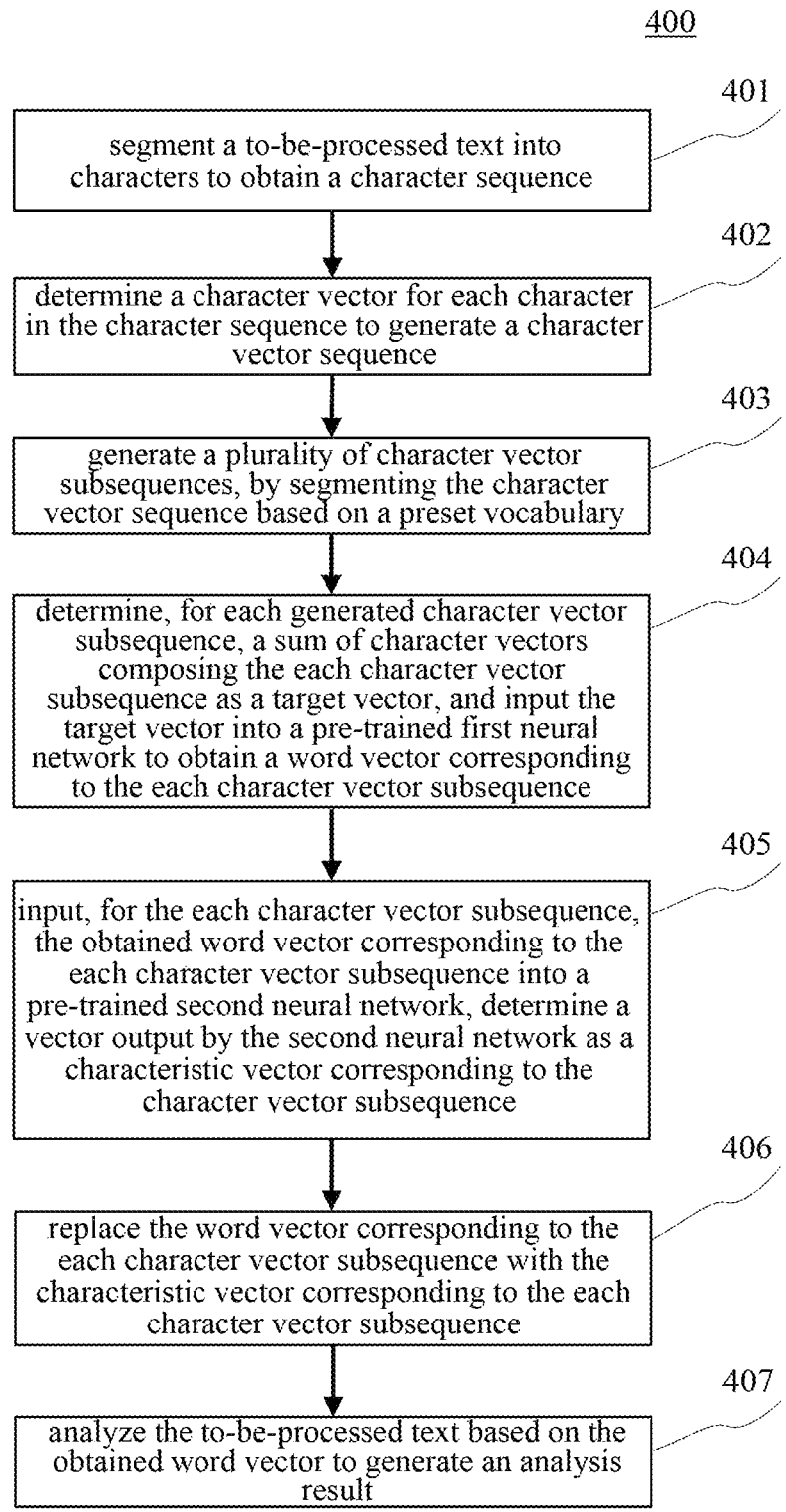
FIG. 4 is a flowchart of another embodiment of the method for generating information according to the present disclosure.

With further reference to FIG. 4, which shows a flow 400 of another embodiment of the method for generating information. The flow 400 of the method for generating information includes the following steps:

Step 401, segmenting a to-be-processed text into characters to obtain a character sequence.

In the present embodiment, the electronic device (e.g., the server 105 as shown in FIG. 1) on which the method for generating information operate may first extract the to-be-processed text, and then segment the to-be-processed text into characters to obtain the character sequence.

Step 402, determining a character vector for each character in the character sequence to generate a character vector sequence.

In the present embodiment, the electronic device may prestore a correspondence table of Chinese characters and graphic symbols contained in the Chinese Internal Code Specification (GBK) with corresponding character vectors, and the character vectors may have the same dimensions. For each character in the character sequence, the electronic device may look up the character vector corresponding to the each character from the correspondence table to generate the character vector sequence. Here, the sequential order of each character vector in the character vector sequence coincides with the sequential order of the character corresponding to the character vector in the character vector sequence.

Step 403, generating a plurality of character vector subsequences, by segmenting the character vector sequence based on a preset vocabulary.

In the present embodiment, the electronic device may prestore the preset vocabulary, and the preset vocabulary may be the vocabulary obtained based on statistics and character segmentation of a large number of corpuses in advance. The preset vocabulary may include a large number of records. Each record is in the form of a key-value pair whose key is a word and whose value is a character sequence of characters composing the word. The electronic device may generate a plurality of character vector subsequences, by segmenting the character vector sequence based on the preset vocabulary. Specifically, the electronic device may first match words that form records in the preset vocabulary with the to-be-processed text, and then perform character segmentation on the to-be-processed text based on the matched words. After that, the electronic device may obtain a character sequence corresponding to each segmented word by looking up the preset vocabulary. Then, for the character sequence corresponding to each segmented word, the electronic device may determine corresponding character vector from the character vector sequence, so as to segment the character vector sequence into a plurality of character vector subsequences.

Step 404, determining, for each generated character vector subsequence, a sum of character vectors composing the each character vector subsequence as a target vector, and inputting the target vector into a pre-trained first neural network to obtain a word vector corresponding to the character vector subsequence.

In the present embodiment, for the each generated character vector subsequence, the electronic device may determine the sum of the character vectors composing the each character vector subsequence as the target vector, and input the target vector into the pre-trained first neural network to obtain the word vector corresponding to the character vector sequence, wherein the first neural network may be used to characterize a correspondence between the target vector and the word vector.

It needs to be noted that the operations of the steps 401-404 are substantially the same to those of the steps 201-204, and detailed description thereof is omitted.

Step 405, for the each character vector subsequence, the electronic device may input the obtained word vector corresponding to the each character vector subsequence into a pre-trained second neural network, and determine a vector output by the second neural network as a characteristic vector corresponding to the character vector subsequence.

In the present embodiment, for the each character vector subsequence, the obtained word vector corresponding to the each character vector subsequence is inputted into the pre-trained second neural network, and the vector output by the second neural network is determined as the characteristic vector corresponding to the character vector subsequence, wherein the second neural network is used to extract a text characteristic. Here, the pre-trained second neural network may be a multi-layer neural network, and neurons in each layer may perform calculation on the input vector using any nonlinear activation function (for example, a tank function, a Sigmoid function, etc.), and output another vector to the next layer of neurons. Here, the pre-trained second neural network may be obtained through supervised training using existing structures such as a Residual Network (ResNet), a Full Connected Network (FCN) and a Multi-Layer Perceptrons (MLP).

In some alternative implementations of the present embodiment, the second neural network may be obtained through training by the following steps. First, a preset second training sample may be extracted, wherein the second training sample may include a plurality of second preset words and word vectors of the second preset words in the plurality of second preset words. After that, for each second preset word in the second training sample, character vectors of the characters composing the each second preset word may be determined, to generate a character vector sequence corresponding to the second preset word. Then, the character vector sequence corresponding to the each second preset word in the second training sample is inputted into the first neural network, and a vector output by the first neural network is determined as an intermediate vector corresponding to the second preset character. Finally, an intermediate vector sequence corresponding to the second preset word is taken as an input, the word vector of the second preset word in the second training sample is taken as an output, to train and obtain the second neural network by using the existing Deep Residual Network (Deep ResNet), using the machine learning method.

Step 406, replacing the word vector corresponding to each character vector subsequence with the characteristic vector corresponding to the each character vector subsequence.

In the present embodiment, the electronic device may replace the word vector corresponding to each character vector subsequence with the characteristic vector corresponding to the character vector subsequence.

Step 407, analyzing the to-be-processed text based on the obtained word vector to generate an analysis result.

In the present embodiment, the electronic device may analyze the to-be-processed text using various analyzing methods based on the obtained word vector to generate the analysis result. It needs to be noted that the electronic device may perform various natural language processing that requires using of a word vector, which may include, but is not limited to, determination of emotion for a text via word segmentation, similarity analysis, spam identification, machine translation, automatic Q&A, and the like.

It needs to be noted that the operation of the step 407 is substantially the same to that of the step 205, and detailed description thereof is omitted.

As can be seen from FIG. 4, compared with the embodiment illustrated in FIG. 2, the flow 400 of the method for generating information in the present embodiment highlights the step of inputting the obtained word vector into the second neural network and the step of replacing. Therefore, in the solution described by the present embodiment, character vectors outputted from the first neural network may be further analyzed to optimize the character vectors, improving the accuracy of text processing.

Figure 5:
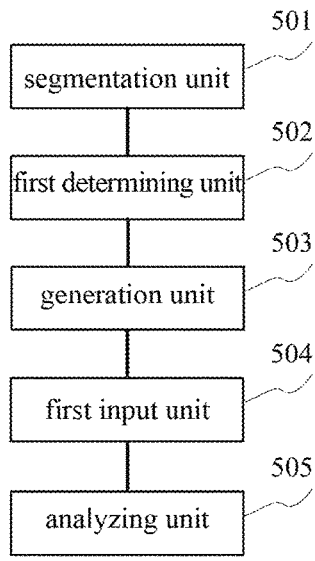
FIG. 5 is a schematic structural diagram of an embodiment of an apparatus for generating information according to the present disclosure.

With further reference to FIG. 5, as an implementation to the method illustrated in the above figures, the present disclosure provides an embodiment of an information generation apparatus. The apparatus embodiment corresponds to the method embodiment shown in FIG. 2, and the apparatus may be specifically applied to various electronic devices.

As shown in FIG. 5, the apparatus 500 for generating information according to the present embodiment includes: a segmentation unit 501, configured to segment a to-be-processed text into characters to obtain a character sequence; a first determining unit 502, configured to determine a character vector for each character in the character sequence to generate a character vector sequence; a generation unit 503, configured to generate a plurality of character vector subsequences, by segmenting the character vector sequence based on a preset vocabulary; a first input unit 504, configured to determine, for each generated character vector subsequence, a sum of character vectors composing the each character vector subsequence as a target vector, and to input the target vector into a pre-trained first neural network to obtain a word vector corresponding to the each character vector subsequence, wherein the first neural network is used to characterize a correspondence between the target vector and the word vector; and an analyzing unit 505, configured to analyze the to-be-processed text based on the obtained word vector to generate an analysis result.

In the present embodiment, the segmentation unit 501 may first extract the to-be-processed text, and then may segment the to-be-processed text into characters to obtain the character sequence.

In the present embodiment, the apparatus 500 for generating information may prestore a correspondence table of Chinese characters and graphic symbols contained in the Chinese Internal Code Specification (GBK) with corresponding character vectors, and the character vectors may have the same dimensions. For each character in the character sequence, the first determining unit 502 may look up the character vector corresponding to the character from the correspondence table to generate the character vector sequence. Here, the sequential order of each character vector in the character vector sequence coincides with the sequential order of the character corresponding to the character vector in the character sequence.

In the present embodiment, the apparatus 500 for generating information may prestore the preset vocabulary, and the preset vocabulary may be the vocabulary obtained based on statistics and character segmentation of a large number of corpuses in advance. The preset vocabulary may include a large number of records. Each record is in the form of key-value pair whose key is a word and whose value is a character sequences of characters composing the word. The generation unit 503 may generate a plurality of character vector subsequences, by segmenting the character vector sequence based on the preset vocabulary. Specifically, words that form records in the preset vocabulary may be first matched with the to-be-processed text, and word segmentation is then performed on the to-be-processed text based on the matched words. After that, a character sequence corresponding to each segmented word may be obtained by looking up the preset vocabulary. Then, for the character sequence corresponding to each segmented word, the corresponding character vectors may be determined from the character vector sequence, so as to segment the character vector sequence into a plurality of character vector subsequences.

In the present embodiment, for the each generated character vector subsequence, the first input unit 504 may determine the sum of the character vectors composing the each character vector subsequence as the target vector, and input the target vector into the pre-trained first neural network to obtain the word vector corresponding to the each character vector sequence, wherein the first neural network may be used to characterize the correspondence between the target vector and the word vector.

In some alternative implementations of the present embodiment, the apparatus 500 for generating information may further include a second input unit and a replacing unit (now shown in the figures). Here, the second input unit is configured to input, for the each character vector subsequence, the obtained word vector corresponding to the each character vector subsequence into a pre-trained second neural network, and to determine a vector output by the second neural network as a characteristic vector corresponding to the character vector subsequence, wherein the second neural network is used to extract a text characteristic. The replacing unit may be configured to replace the word vector corresponding to the each character vector subsequence with the characteristic vector corresponding to the each character vector subsequence.

In some alternative implementations of the present embodiment, the analyzing unit may be further configured to input the obtained word vector into a pre-trained text emotion analysis model to obtain a text emotion analysis result corresponding to the to-be-processed text, wherein the emotion analysis model is used to characterize a correspondence between the word vector and the text emotion analysis result.

In some alternative implementations of the present embodiment, the analyzing unit may be further configured to: extract successively word vectors corresponding to the character vector subsequences according to a sequential order of the character vector subsequences in character vectors, to generate a word vector sequence; input the word vector sequence and a pre-generated word vector sequence corresponding to a preset text respectively into a pre-trained similarity calculation model, to obtain a similarity calculation result of the to-be-processed text and the preset text, wherein the similarity calculation model is used to characterize a correspondence between the word vector sequence corresponding to a plurality of texts and a similarity calculation result of the plurality of texts.

In some alternative implementations of the present embodiment, the apparatus 500 for generating information may further include a first extraction unit, a second determining unit and a first training unit (not shown in the figures). Here, the first extraction unit may be configured to extract a preset first training sample, wherein the first training sample includes a plurality of first preset words and word vectors of the first preset words in the plurality of first preset words. The second determining unit may be configured to determine, for each of the plurality of first preset word in the first training sample, character vectors for characters composing the first preset word, to generate a character vector sequence corresponding to the first preset word. The first training unit may be configured to train and obtain the first neural network, by using a machine learning method, and by assigning the character vector sequence corresponding to the first preset word as an input, and the word vector of the first preset word in the first training sample as an output.

In some alternative implementations of the present embodiment, the apparatus 500 for generating information may further include a second extraction unit, a third determining unit, a third input unit and a second training unit (not shown in the figures). Here, the second extraction unit maybe configured to extract a preset second training sample, wherein the second training sample includes a plurality of second preset words and word vectors of the second preset words in the plurality of second preset words. The third determining unit may be configured to determine, for each of the plurality of second preset words in the second training sample, character vectors for characters composing the second preset word, to generate a character vector sequence corresponding to the second preset word. The third input unit may be configured to input the character vector sequence corresponding to each second preset character in the second training sample into the first neural network, and to determine a vector output by the first neural network as an intermediate vector corresponding to the second preset character. The second training unit may be configured to train and obtain the second neural network, by using the machine learning method, and by assigning an intermediate vector sequence corresponding to the second preset word as an input, and the word vector of the second preset word in the second training sample as an output.

In the above apparatus according to the embodiment of the present application, the segmentation unit 501 segments a to-be-processed text into characters to obtain a character sequence, in order that the first determining unit 502 determines a character vector for each character in the character sequence to generate a character vector sequence, then the generation unit 503 generates a plurality of character vector subsequences by segmenting the character vector sequence based on a preset vocabulary, then the first input unit 504 obtains a word vector corresponding to each generated character vector subsequence based on a pre-trained first neural network, and finally the analyzing unit 505 analyzes the to-be-processed text based on the obtained word vector to generate an analysis result. Accordingly, the apparatus provided by the embodiments of the present disclosure may generate a word vector based on character vectors. Since the number of Chinese characters is far less than the number of Chinese words, and word vectors maybe automatically generated by a pre-trained neural network without occupying static storage space, performance requirements for physical storage, network transmission and memory of computing devices may be therefore reduced, improving the adaptability of text processing.

Figure 6:
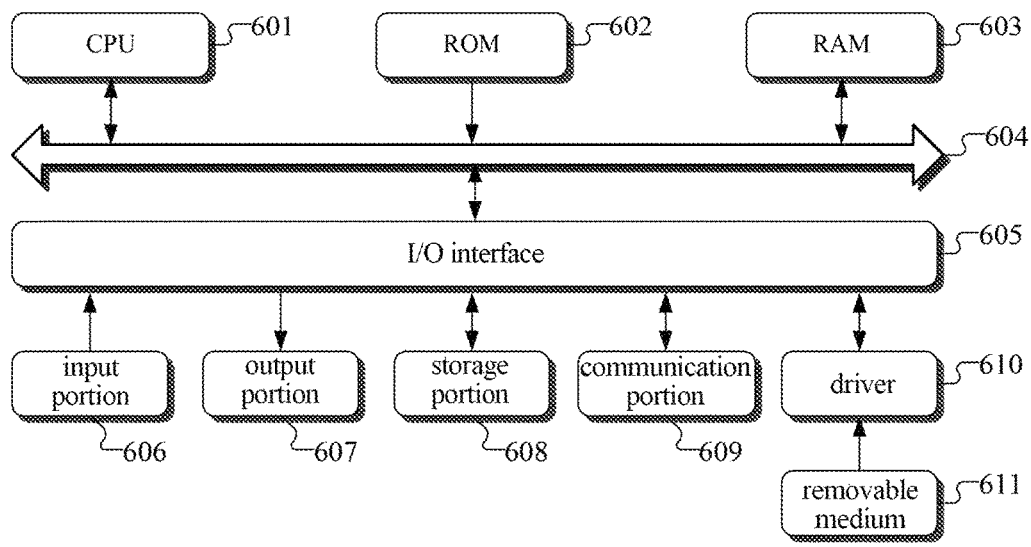
FIG. 6 is a schematic structural diagram of a computer system adapted to implement a server of embodiments of the present disclosure.

With reference to FIG. 6, a schematic structural diagram of a computer system 600 adapted to implement a server of the embodiments of the present disclosure is illustrated. The server shown in FIG. 6 is merely an example and should not impose any restriction on the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, maybe installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is carried on a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that maybe implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession maybe executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a segmentation unit, a first determining unit, a first input unit and an analyzing unit, where the names of these units or modules do not in some cases constitute a limitation to such units or modules themselves. For example, the segmentation unit may also be described as "a unit for segmenting a to-be-processed text into characters".

In another aspect, the present disclosure further provides a non-volatile computer-readable storage medium. The non-volatile computer-readable storage medium may be the non-volatile computer storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: segment a to-be-processed text into characters to obtain a character sequence; determine character vector for each character in the character sequence to generate a character vector sequence; generate a plurality of character vector subsequences, by segmenting the character vector sequence based on a preset vocabulary; determine, for each generated character vector subsequence, a sum of character vectors composing the each character vector subsequence as a target vector, and input the target vector into a pre-trained first neural network to obtain a word vector corresponding to the each character vector subsequence, wherein the first neural network is used to characterize a correspondence between the target vector and the word vector; and analyze the to-be-processed text based on the obtained word vector to generate an analysis result.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. An artificial intelligence based method for generating information, the method comprising:
    segmenting a to-be-processed text into characters to obtain a character sequence;
    determining a character vector for each character in the character sequence to generate a character vector sequence;
    generating a plurality of character vector subsequences, by segmenting the character vector sequence based on a preset vocabulary;
    determining, for each generated character vector subsequence, a sum of character vectors composing the each character vector subsequence as a target vector, and inputting the target vector into a pre-trained first neural network to obtain a word vector corresponding to the each character vector subsequence, wherein the first neural network is used to characterize a correspondence between the target vector and the word vector;
    inputting, for the each character vector subsequence, the obtained word vector corresponding to the each character vector subsequence into a pre-trained second neural network, determining a vector output by the second neural network as a characteristic vector corresponding to the character vector subsequence, wherein the second neural network is used to extract a text characteristic;
    replacing the word vector corresponding to the each character vector subsequence with the characteristic vector corresponding to the each character vector subsequence; and
    analyzing the to-be-processed text based on the obtained word vector to generate an analysis result;
    wherein the method further comprises training the second neural network, comprising:
        extracting a preset second training sample, wherein the second training sample includes a plurality of second preset words and word vectors of the second preset words in the plurality of second preset words;
        determining, for each of the plurality of second preset words in the second training sample, character vectors for character composing the second preset word, to generate a character vector sequence corresponding to the second preset word;
        inputting the character vector sequence corresponding to each second preset word in the second training sample into the first neural network, and determining a vector output by the first neural network as an intermediate vector corresponding to the second preset word; and
        training and obtaining the second neural network, by using the machine learning method, and by assigning an intermediate vector sequence corresponding to the second preset word as an input, and the word vector of the second preset word in the second training sample as an output.

2. The method for generating information according to claim 1, wherein the analyzing the to-be-processed text based on the obtained word vector to generate an analysis result comprises:
    inputting the obtained word vector into a pre-trained text emotion analysis model to obtain a text emotion analysis result corresponding to the to-be-processed text, wherein the emotion analysis model is used to characterize a correspondence between the word vector and the text emotion analysis result.

3. The method for generating information according to claim 1, wherein the analyzing the to-be-processed text based on the obtained word vector to generate an analysis result comprises:
    extracting successively word vectors corresponding to the character vector subsequences according to a sequential order of the character vector subsequences in character vectors, to generate a word vector sequence; and
    inputting the word vector sequence and a pre-generated word vector sequence corresponding to a preset text respectively into a pre-trained similarity calculation model, to obtain a similarity calculation result of the to-be-processed text and the preset text, wherein the similarity calculation model is used to characterize a correspondence between the word vector sequence corresponding to a plurality of texts and a similarity calculation result of the plurality of texts.

4. The method for generating information according to claim 1, wherein the method further comprises training the first neural network, comprising:
    extracting a preset first training sample, wherein the first training sample includes a plurality of first preset words and word vectors of the first preset words in the plurality of first preset words;
    determining, for each of the plurality of first preset words in the first training sample, character vectors for characters composing the first preset word, to generate a character vector sequence corresponding to the first preset word; and
    training and obtaining the first neural network, by using a machine learning method, and by assigning the character vector sequence corresponding to the first preset word as an input, and the word vector of the first preset word in the first training sample as an output.

5. An artificial intelligence based apparatus for generating information, the apparatus comprising:
    at least one processor; and
    a memory storing instructions, which when executed by the at least one processor, cause the at least one processor to perform operations, the operations comprising:
        segmenting a to-be-processed text into characters to obtain a character sequence;
        determining a character vector for each character in the character sequence to generate a character vector sequence;
        generating a plurality of character vector subsequences, by segmenting the character vector sequence based on a preset vocabulary;
        determining, for each generated character vector subsequence, a sum of character vectors composing the each character vector subsequence as a target vector, and inputting the target vector into a pre-trained first neural network to obtain a word vector corresponding to the each character vector subsequence, wherein the first neural network is used to characterize a correspondence between the target vector and the word vector;

inputting, for the each character vector subsequence, the obtained word vector corresponding to the each character vector subsequence into a pre-trained second neural network, determining a vector output by the second neural network as a characteristic vector corresponding to the character vector subsequence, wherein the second neural network is used to extract a text characteristic;

replacing the word vector corresponding to the each character vector subsequence with the characteristic vector corresponding to the each character vector subsequence; and analyzing the to-be-processed text based on the obtained word vector to generate an analysis result;

wherein the operations further comprise training the second neural network, and the training the second neural network comprises:

extracting a preset second training sample, wherein the second training sample includes a plurality of second preset words and word vectors of the second preset words in the plurality of second preset words;

determining, for each of the plurality of second preset words in the second training sample, character vectors for character composing the second preset word, to generate a character vector sequence corresponding to the second preset word;

inputting the character vector sequence corresponding to each second preset word in the second training sample into the first neural network, and determining a vector output by the first neural network as an intermediate vector corresponding to the second preset word; and training and obtaining the second neural network, by using the machine learning method, and by assigning an intermediate vector sequence corresponding to the second preset word as an input, and the word vector of the second preset word in the second training sample as an output.

6. The apparatus for generating information according to claim 5, wherein the analyzing the to-be-processed text based on the obtained word vector to generate an analysis result comprises:

inputting the obtained word vector into a pre-trained text emotion analysis model to obtain a text emotion analysis result corresponding to the to-be-processed text, wherein the emotion analysis model is used to characterize a correspondence between the word vector and the text emotion analysis result.

7. The apparatus for generating information according to claim 5, wherein the analyzing the to-be-processed text based on the obtained word vector to generate an analysis result comprises:

extracting successively word vectors corresponding to the character vector subsequences according to a sequential order of the character vector subsequences in character vectors, to generate a word vector sequence; and inputting the word vector sequence and a pre-generated word vector sequence corresponding to a preset text respectively into a pre-trained similarity calculation model, to obtain a similarity calculation result of the to-be-processed text and the preset text, wherein the similarity calculation model is used to characterize a correspondence between the word vector sequence corresponding to a plurality of texts and a similarity calculation result of the plurality of texts.

8. The apparatus for generating information according to claim 5, wherein the operations further comprise training the first neural network, and the training the first neural network comprises:

extracting a preset first training sample, wherein the first training sample includes a plurality of first preset words and word vectors of the first preset words in the plurality of first preset words;

determining, for each of the plurality of first preset words in the first training sample, character vectors for character composing the first preset word, to generate a character vector sequence corresponding to the first preset word; and training and obtaining the first neural network, by using a machine learning method, and by assigning the character vector sequence corresponding to the first preset word as an input, and the word vector of the first preset word in the first training sample as an output.

9. A non-transitory computer readable storage medium, storing a computer program thereon, the computer program, when executed by a processor, performs an artificial intelligence based method for generating information, the method comprising:

segmenting a to-be-processed text into characters to obtain a character sequence;

determining a character vector for each character in the character sequence to generate a character vector sequence;

generating a plurality of character vector subsequences, by segmenting the character vector sequence based on a preset vocabulary;

determining, for each generated character vector subsequence, a sum of character vectors composing the each character vector subsequence as a target vector, and inputting the target vector into a pre-trained first neural network to obtain a word vector corresponding to the each character vector subsequence, wherein the first neural network is used to characterize a correspondence between the target vector and the word vector;

inputting, for the each character vector subsequence, the obtained word vector corresponding to the each character vector subsequence into a pre-trained second neural network, determining a vector output by the second neural network as a characteristic vector corresponding to the character vector subsequence, wherein the second neural network is used to extract a text characteristic;

replacing the word vector corresponding to the each character vector subsequence with the characteristic vector corresponding to the each character vector subsequence; and analyzing the to-be-processed text based on the obtained word vector to generate an analysis result;

wherein the method further comprises training the second neural network, comprising:

extracting a preset second training sample, wherein the second training sample includes a plurality of second preset words and word vectors of the second preset words in the plurality of second preset words;

determining, for each of the plurality of second preset words in the second training sample, character vectors for character composing the second preset word, to generate a character vector sequence corresponding to the second preset word;

inputting the character vector sequence corresponding to each second preset word in the second training sample into the first neural network, and determining a vector output by the first neural network as an intermediate vector corresponding to the second preset word; and training and obtaining the second neural network, by using the machine learning method, and by assigning an intermediate vector sequence corresponding to the second preset word as an input, and the word vector of the second preset word in the second training sample as an output.

\* \* \* \* \*